United States Patent
Liao et al.

(10) Patent No.: US 9,667,332 B1
(45) Date of Patent: May 30, 2017

(54) MIMO NETWORK SYSTEM AND INTERFERENCE ELIMINATING METHOD THEREOF

(71) Applicant: Institute For Information Industry, Taipei (TW)

(72) Inventors: Shu-Han Liao, New Taipei (TW); Chun-Che Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/090,857

(22) Filed: Apr. 5, 2016

(51) Int. Cl.
*H04B 7/06* (2006.01)
*H04B 7/0413* (2017.01)

(52) U.S. Cl.
CPC ......... *H04B 7/0632* (2013.01); *H04B 7/0413* (2013.01)

(58) Field of Classification Search
USPC .............. 375/260; 370/329, 208; 455/277.2, 455/562.1
See application file for complete search history.

(56) References Cited

U.S. PATENT DOCUMENTS

| | | | |
|---|---|---|---|
| 2003/0128658 A1* | 7/2003 | Walton | H04L 1/06 370/208 |
| 2006/0171354 A1* | 8/2006 | Tee | H04L 1/0045 370/329 |
| 2007/0191068 A1* | 8/2007 | Ochi | H01Q 1/2258 455/562.1 |
| 2009/0286498 A1* | 11/2009 | Katayanagi | H04B 1/1081 455/277.2 |
| 2014/0273884 A1* | 9/2014 | Mantravadi | H04B 1/38 455/73 |

* cited by examiner

*Primary Examiner* — Eva Puente
(74) *Attorney, Agent, or Firm* — Skaar Ulbrich Macari, P.A.

(57) ABSTRACT

A MIMO network system and an interference eliminating method thereof are provided. MIMO network system includes a first mobile station and a base station. The base station has a plurality of antennas which are used for transmitting data to the first mobile station and receiving data from a second mobile station at the same time. The first mobile station determines an interference quality value according to a signal from the second mobile station and transmits the interference quality value to the base station. The base station determines a first receiving performance of the first mobile station according to the interference quality value and adjusts an antenna setting of the antennas according to the first receiving performance.

24 Claims, 7 Drawing Sheets

MIMO NETWORK SYSTEM AND INTERFERENCE ELIMINATING METHOD THEREOF

FIELD

The present invention relates to a MIMO network system and an interference eliminating method thereof. More particularly, the present invention relates to a MIMO network system and an interference eliminating method thereof for solving the problems of inter-user interference and self-interference.

BACKGROUND

In conventional Multiple-Input Multiple-Output (MIMO) system, base station is capable of communicating with the mobile stations via a plurality of antennas for enhancing the throughput. In addition, for further reducing the data transmission period, Full-Duplex technique (e.g., Co-time Co-frequency Full Duplex) can be applied in MIMO system.

However, in MIMO system with Full-Duplex technique, since there are antennas on the base station, Self-Interference among the antennas could be caused while part of the antennas are used for transmitting data and part of the antennas are used for receiving data at the same time. Moreover, based on Full-Duplex technique, if mobile stations are too close, Inter-User Interference could be caused while part of the mobile stations are transmitting data and part of the mobile station are receiving data at the same time. Therefore, the efficiency of transmitting data is low when the Self-Interference and the Inter-Use Interference happen in the meantime.

Accordingly, an urgent need exists in the art to eliminate both the Self-Interference and the Inter-Use Interference in the MIMO system with Full-Duplex technique for improving the efficiency of the data transmission.

SUMMARY

The disclosure includes an interference eliminating method for a Multiple-Input Multiple-Output (MIMO) network system. The MIMO network system comprises a base station and a first mobile station. The base station has a plurality of antennas which are used for transmitting data to the first mobile station and receiving data from a second mobile station at the same time. The interference eliminating method comprises: (a) receiving, by the first mobile station, a signal from the second mobile station; (b) determining, by the first mobile station, an interference quality value according to the signal; (c) transmitting, by the first mobile station, the interference quality value to the base station; (d) determining, by the base station, a first receiving performance of the first mobile station according to the interference quality value; (e) adjusting, by the base station, an antenna setting of the antennas according to the first receiving performance. The antenna setting records a transmitting antenna configuration and a receiving antenna configuration.

The disclosure further includes a MIMO network system which comprises a first mobile station and a base station. The base station has a plurality of antennas which are used for transmitting data to the first mobile station and receiving data from a second mobile station at the same time. The first mobile station receives a signal from the second mobile station and determines an interference quality value according to the signal. The first mobile station transmits the interference quality value to the base station. The base station determines a first receiving performance of the first mobile station according to the interference quality value. The base station adjusts an antenna setting of the antennas stored in the base station according to the first receiving performance. The antenna setting records a transmitting antenna configuration and a receiving antenna configuration.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any specific examples, embodiments, environment, applications or implementations described in these example embodiments. Therefore, description of these example embodiments is only for purpose of illustration rather than to limit the present invention.

In the following embodiments and the attached drawings, elements unrelated to the present invention are omitted from depiction; and dimensional relationships among individual elements in the attached drawings are illustrated only for ease of understanding, but not to limit the actual scale.

Figure 1A:
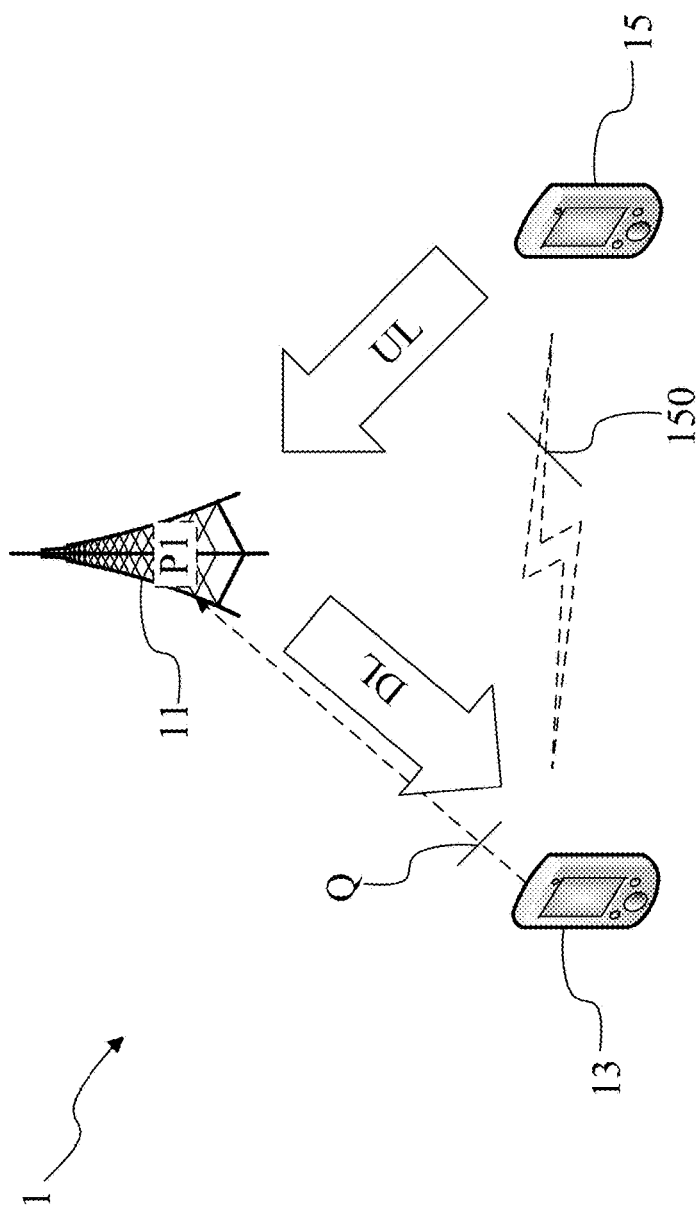
FIG. 1A is a schematic view of a MIMO network system according to a first embodiment of the present invention.
Figure 1B:
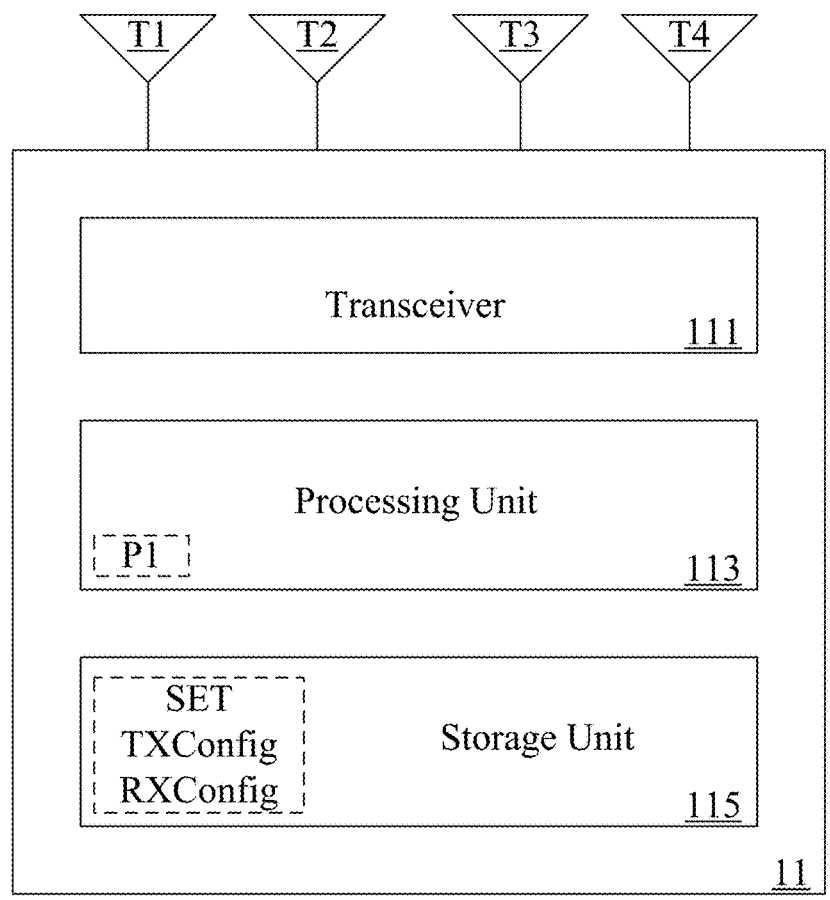
FIG. 1B is a block diagram of a base station according to the first embodiment of the present invention.
Figure 1C:
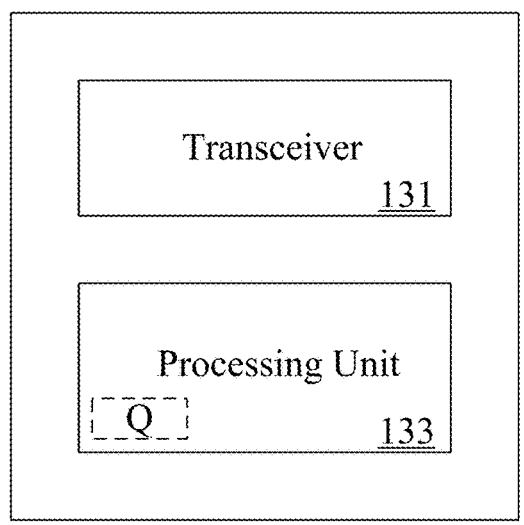
FIG. 1C is a block diagram of a first mobile station according to the first embodiment of the present invention.

Please refer to FIG. 1A to FIG. 1C together. FIG. 1A is a schematic view of a Multiple-Input Multiple-Output (MIMO) network system 1 according to a first embodiment of the present invention. The MIMO network system 1 comprises a base station 11, a first mobile station 13 and a second mobile station 15. FIG. 1B is a block diagram of the base station 11 according to the present invention, and the base station 11 comprises a plurality of antennas T1~T4, a transceiver 111, a processing unit 113 and a storage unit 115. The storage unit 115 stores an antenna setting SET which records a transmitting antenna configuration TXConfig and a receiving antenna configuration RXConfig.

FIG. 1C is a block diagram of the first mobile station 13 according to the present invention, and the first mobile station 13 comprises a transceiver 131 and a processing unit 133. The interaction between the MIMO network system 1 and the devices thereof will be further described hereinafter.

Firstly, in the first embodiment, the base station 11 uses antenna T1~T2 for transmitting data (Downlink, DL) to the first mobile station 13 and uses antenna T3~T4 for receiving data (Uplink, UL) from the second mobile station 15 at the same time under Full-Duplex technique (e.g., Co-time Co-frequency Full Duplex, CCFD). Therefore, interference could be happened between the first mobile station 13 and the second mobile station 15.

Accordingly, the transceiver 131 of the first mobile station 13 receives a signal 150 from the second mobile station 15 for interference measuring purpose. Then the processing unit 133 of the first mobile station 13 determines an interference quality value Q according to the signal 150. It should be noted that the interference quality value Q could be the quantified interference quality of service (QoS) value (e.g., Signal to Interference plus Noise Ratio value, Received Signal Strength Indication value, etc.). The people skilled in the art should easily understand and will not be further described herein.

Next, the transceiver 131 of the first mobile station 13 transmits the interference quality value Q to the base station 11. In other words, the transceiver 111 of the base station 11 receives the interference quality value Q from the first mobile station 13. Afterwards, the processing unit 113 determines a first receiving performance P1 of the first mobile station 13 according to the interference quality value Q. Finally, the processing unit 113 of the base station 11 adjusts the antenna setting SET of the antennas T1~T4 according to the first receiving performance P1 for eliminating the interference among the antennas T1~T4 (e.g., Self-Interference).

More specifically, the transmitting antenna configuration TXConfig includes a transmitting antenna number (e.g., 2 in the first embodiment) and a transmitting antenna allocation, and the receiving antenna configuration RXConfig includes a receiving antenna number (e.g., 2 in the first embodiment) and a receiving antenna allocation.

Therefore, if the first receiving performance P1 of the first mobile station 13 is lower than an expected value (e.g., lower than a performance threshold), the antenna setting SET is adjusted (e.g., increasing transmitting antenna number or re-allocating the antenna allocation by changing an antenna from receiving antenna to transmitting antenna) to increase the receiving performance of the first mobile station 13.

It should be further appreciated that if the first receiving performance P1 of the first mobile station 13 is lower than an expected value, the processing unit 113 of the base station 11 can adjust a transmitting power of the base station 11 itself expect adjusting the antenna setting SET. Increasing the transmitting power of the base station 11 can also increase the receiving performance of the first mobile station 13.

Figure 2:
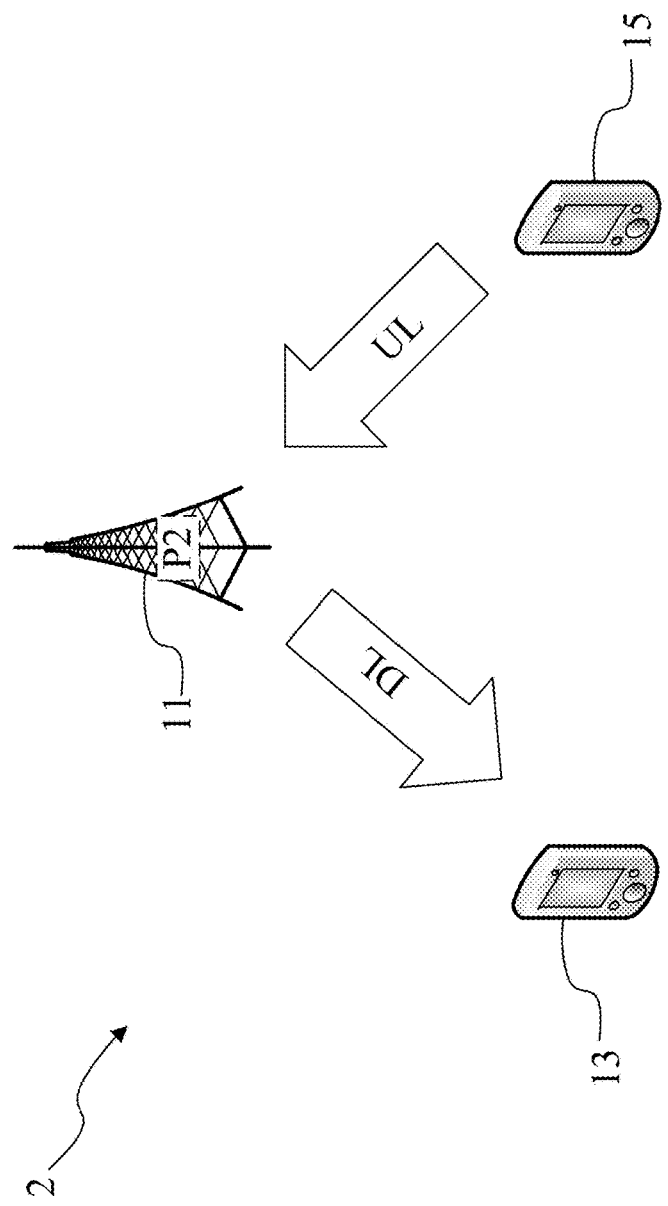
FIG. 2 is a schematic view of a MIMO network system according to a second embodiment of the present invention.

Please refer to FIG. 2, which is a schematic view of a MIMO system 2 according to a second embodiment of the present invention. The second embodiment is similar to the first embodiment in terms of the network architecture, so elements bearing the same reference numerals also have the same functions and will not be described again herein. The second embodiment is mainly to further describe details of the evaluation of the performance.

After adjusting the antenna setting SET of the antennas T1~T4 according to the first receiving performance P1, the processing unit 113 of the base station 11 further determines a second receiving performance P2 of the base station 11, and then adjusts the antenna setting SET of the antennas T1~T4 according to the second receiving performance P2. It should be noted that the second receiving performance P2 of the base station 11 can be evaluated by the data transmission between the base station 11 and the second mobile station 15.

Particularly, if the second receiving performance P2 of the base station 11 is lower than an expected value (e.g., lower than a performance threshold), it means that the performance of transmitting data from the second mobile station 15 to the base station 11 is bad. Accordingly, the antenna setting SET can be also adjusted (e.g., increasing receiving antenna number or re-allocating the antenna allocation by changing an antenna from transmitting antenna to receiving antenna) to increase the receiving performance of the base station 11.

Figure 3A:
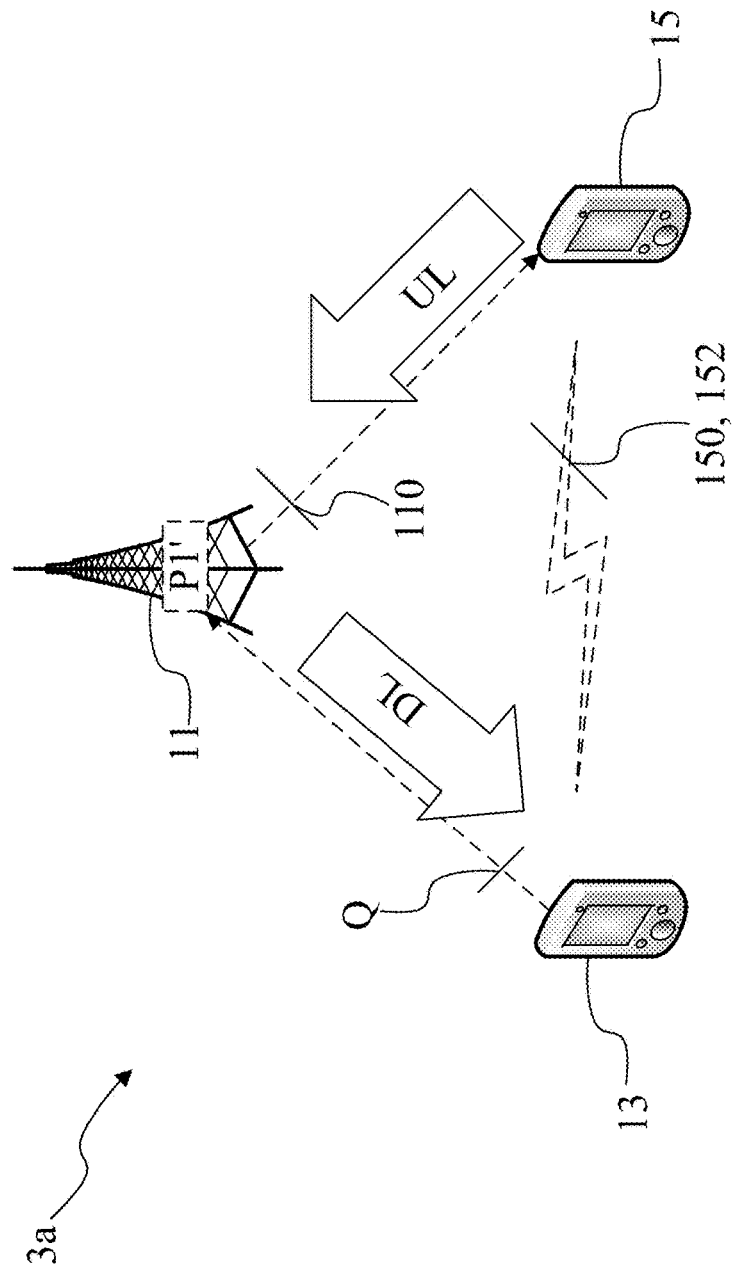
FIG. 3A to FIG. 3B are schematic views of a MIMO network system according to a third embodiment of the present invention.
Figure 3B:
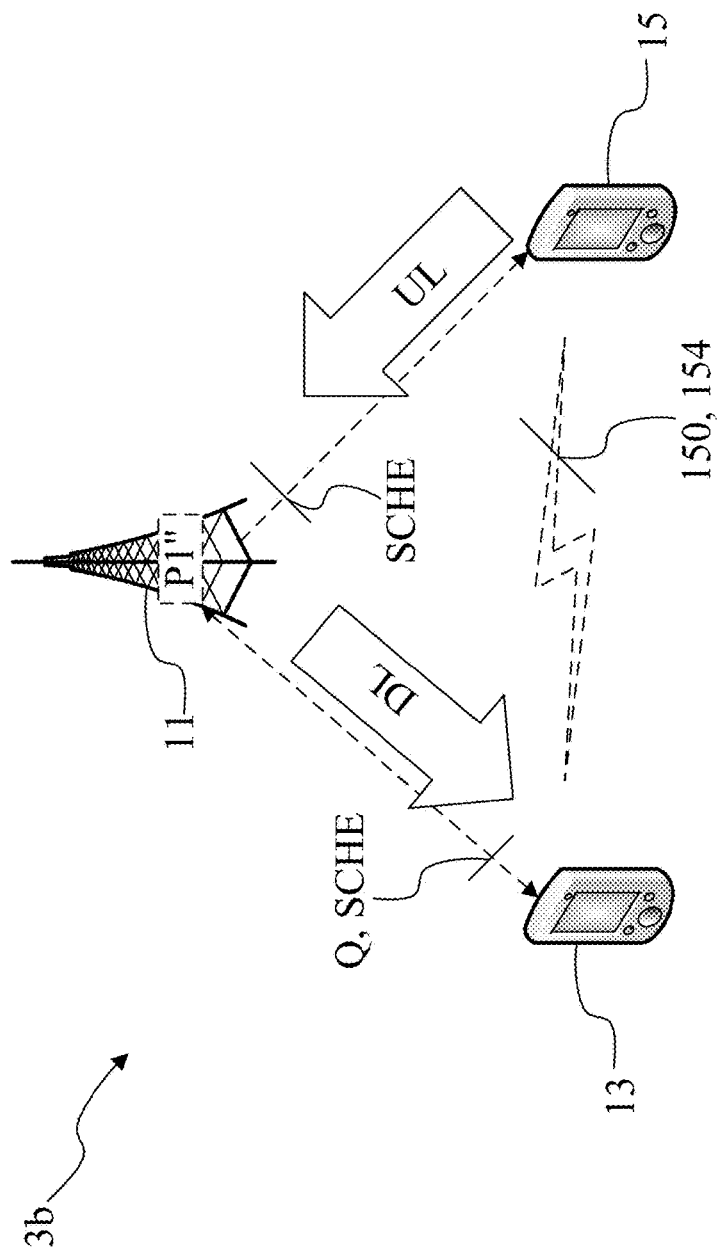

Please refer to FIGS. 3A and 3B, which are schematic views of MIMO systems 3a and 3b according to a third embodiment of the present invention. The third embodiment is similar to the first embodiment in terms of the network architecture, so elements bearing the same reference numerals also have the same functions and will not be described again herein. The third embodiment is mainly to further describe details method.

Referring to FIG. 3A, similarly, the transceiver 131 of the first mobile station 13 receives the signal 150 from the second mobile station 15 for interference measuring purpose. Then the processing unit 133 of the first mobile station 13 determines the interference quality value Q according to the signal 150, and the transceiver 131 of the first mobile station 13 then transmits the interference quality value Q to the base station 11.

Moreover, the processing unit 113 of the base station 11 determines if the interference quality value Q is less than a threshold (not shown). If the interference quality value Q is less than the threshold, it means that the interference (e.g., Inter-User Interference) between the first mobile station 13 and the second mobile station 15 is serious. Accordingly, the transceiver 111 of the base station 11 transmits a notification 110 to the second mobile station 15 while the notification 110 is used for notifying the second mobile station 15 to adjust (e.g., decrease) transmitting power for decreasing the interference.

Then, the transceiver 131 of the first mobile station 13 receives another signal 152 from the second mobile station 15 for re-evaluation. Specifically, the processing unit 133 of the first mobile station 13 updates the interference quality value Q according to the another signal 152, and then the transceiver 131 of the first mobile station 13 transmits the updates interference quality value Q to the base station 11.

Afterwards, the processing unit 113 determines a first receiving performance P1' of the first mobile station 13 according to the updated interference quality value Q. Finally, the processing unit 113 of the base station 11 adjusts the antenna setting SET of the antennas T1~T4 according to the first receiving performance P1'.

Referring to FIG. 3B, in the another implementation, if the interference quality value Q is less than the threshold, the processing unit 113 of the base station transmits a data transmission schedule SCHE to the first mobile station 13 and the second mobile station 15 via the transceiver 111. Therefore, the first mobile station 13 and the second mobile station 15 are capable of re-scheduling the downlink and uplink transmissions for trying to decrease the interference.

Then, similarly, the transceiver 131 of the first mobile station 13 receives another signal 154 from the second mobile station 15 for re-evaluation. Specifically, the processing unit 133 of the first mobile station 13 updates the interference quality value Q according to the another signal 154, and then the transceiver 131 of the first mobile station 13 transmits the updates interference quality value Q to the base station 11.

Afterwards, the processing unit 113 determines a first receiving performance P1" of the first mobile station 13 according to the updated interference quality value Q. Finally, the processing unit 113 of the base station 11 adjusts the antenna setting SET of the antennas T1~T4 according to the first receiving performance P1".

Figure 4:
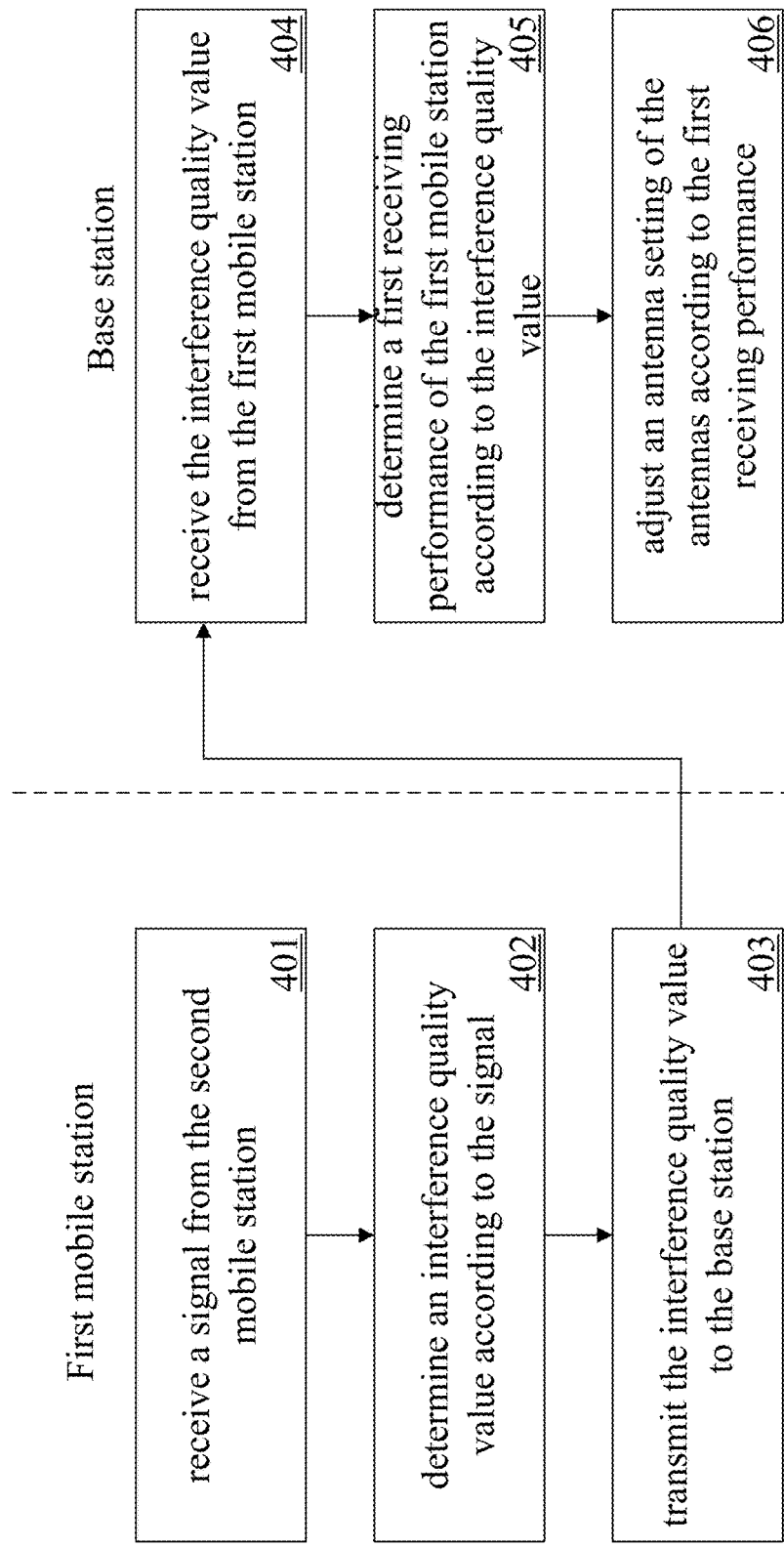
FIG. 4 is a flowchart diagram of an interference eliminating method according to a fourth embodiment of the present invention.

A fourth embodiment of the present invention is an interference eliminating method, referring to FIG. 4 for a flowchart diagram of the method. The method of the fourth embodiment is for use in a MIMO network system (e.g., the MIMO network systems of the aforesaid embodiments) which comprises a base station and a first mobile station. The base station has a plurality of antennas which are used for transmitting data to the first mobile station and receiving data from a second mobile station at the same time. Detailed steps of the fourth embodiment are as follows.

First, step 401 is executed by the first mobile station to receive a signal from the second mobile station. Step 402 is executed by the first mobile station to determine an interference quality value according to the signal. Then, step 403 is executed by the first mobile station to transmit the interference quality value to the base station. Sep 404 is executed by the base station to receive the interference quality value from the first mobile station.

Next, step 405 is executed by the base station to determine a first receiving performance of the first mobile station according to the interference quality value. Final, step 406 is executed by the base station to adjust an antenna setting of the antennas according to the first receiving performance.

It should be noted that the antenna setting records a transmitting antenna configuration and a receiving antenna configuration. Further, the transmitting antenna configuration includes a transmitting antenna number and a transmitting antenna allocation, and the receiving antenna configuration includes a receiving antenna number and a receiving antenna allocation.

Accordingly, increasing transmitting antenna number or re-allocating the antenna allocation by changing an antenna from receiving antenna to transmitting antenna can increase the receiving performance of the first mobile station. On the other hand, increasing receiving antenna number or re-allocating the antenna allocation by changing an antenna from transmitting antenna to receiving antenna can increase the receiving performance of the base station.

Figure 5:
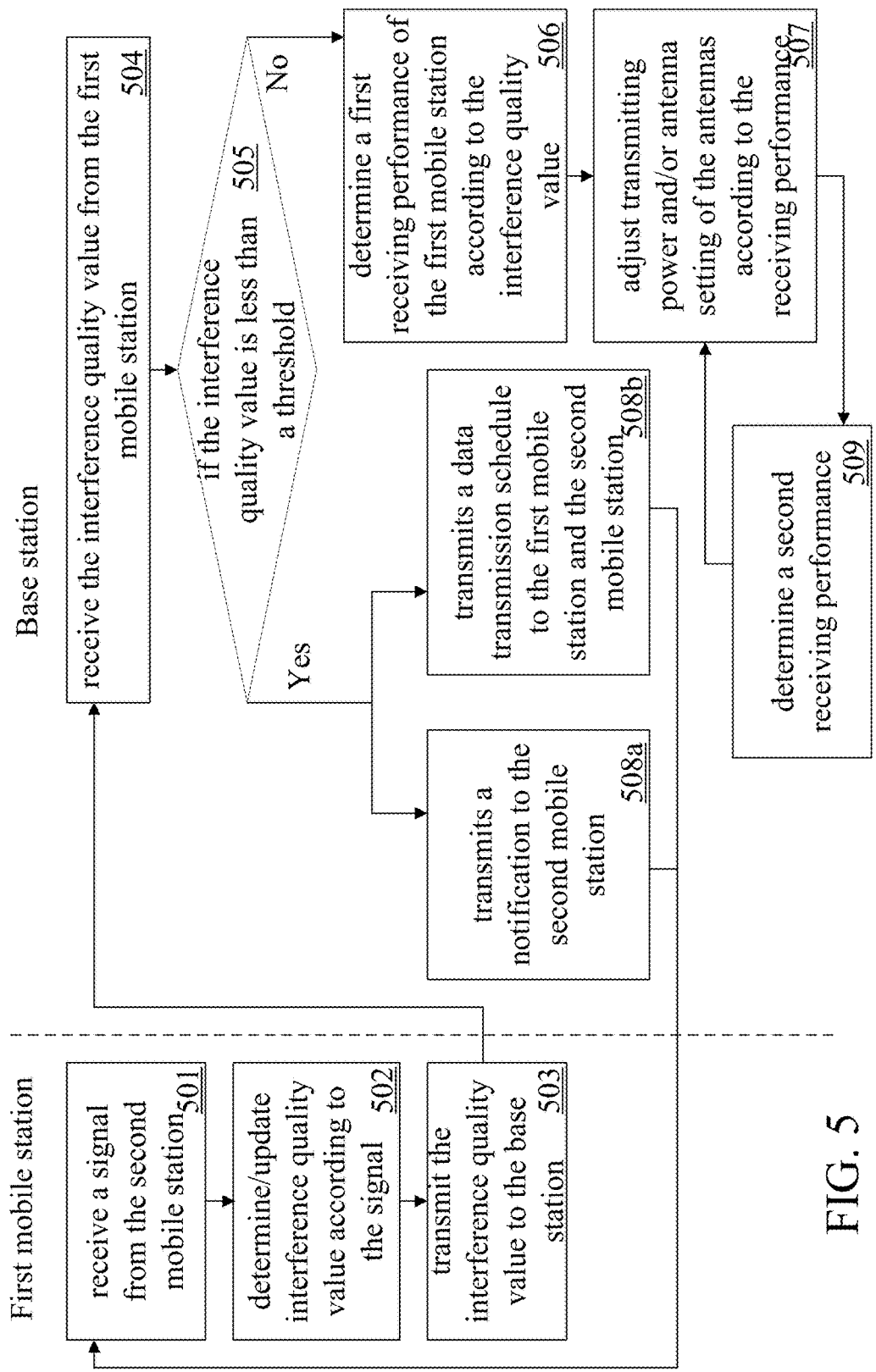
FIG. 5 is a flowchart diagram of a interference eliminating method according to an fifth embodiment of the present invention.

A fifth embodiment of the present invention is an interference eliminating method, referring to FIG. 5 for a flowchart diagram of the method. The method of the fifth embodiment is for use in a MIMO network system (e.g., the MIMO network systems of the aforesaid embodiments) which comprises a base station and a first mobile station. The base station has a plurality of antennas which are used for transmitting data to the first mobile station and receiving data from a second mobile station at the same time. Detailed steps of the fifth embodiment are as follows.

First, step 501 is executed by the first mobile station to receive a signal from the second mobile station. Step 502 is executed by the first mobile station to determine an interference quality value according to the signal. Then, step 503 is executed by the first mobile station to transmit the interference quality value to the base station. Sep 504 is executed by the base station to receive the interference quality value.

Step 505 is executed by the base station to determine if the interference quality value is less than a threshold. If the interference quality value is not less than the threshold, step 506 is executed by the base station to determine a first receiving performance of the first mobile station according to the interference quality value. Step 507 is executed by the base station to adjust an antenna setting of the antennas according to the first receiving performance.

On the other hand, if the interference quality value is less than the threshold, steps 508a or 508b is executed optionally or sequentially by the base station. When step 508a is executed, the base station transmits a notification to the second mobile station according to the result of step 505. The notification is used for notifying the second mobile station to adjust (e.g., decrease) a transmitting power for decrease Inter-user Interference. On the other hand, when step 508b is executed, the base station transmits a data transmission schedule to the first mobile station and the second mobile station according to the result of step 505.

Then, step 501 is re-executed by the first mobile station again to receive another signal from the second mobile station. Step 502 is then executed by the first mobile station to determine (so to speak, update) the interference quality value according to the another signal again.

It should be noted that, after step 507 in the fifth embodiment, step 509 could be executed by the base station to determine a second receiving performance of the base station. Next, step 507 is executed by the base station to adjust the antenna setting of the antennas according to the all the feedback receiving performances.

According to the above descriptions, the Inter-User interference can be eliminated by the direct interference feedback from the mobile station, and the Self-Interference can be eliminated by adjusting the number and location of the antennas of the base station itself. Therefore, different interferences existed in the conventional MIMO network system can be eliminating at the same time.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An interference eliminating method for a Multiple-Input Multiple-Output (MIMO) network system, the MIMO network system comprising a base station and a first mobile station, the base station having a plurality of antennas which are used for transmitting data to the first mobile station and receiving data from a second mobile station at the same time, the interference eliminating method comprising:

(a) receiving, by the first mobile station, a signal from the second mobile station;

(b) determining, by the first mobile station, an interference quality value according to the signal;

(c) transmitting, by the first mobile station, the interference quality value to the base station;

(d) determining, by the base station, a first receiving performance of the first mobile station according to the interference quality value;

(e) adjusting, by the base station, an antenna setting of the antennas according to the first receiving performance, wherein the antenna setting records a transmitting antenna configuration and a receiving antenna configuration.

2. The interference eliminating method of claim 1, wherein the transmitting antenna configuration includes a transmitting antenna number and a transmitting antenna allocation, and the receiving antenna configuration includes a receiving antenna number and a receiving antenna allocation.

3. The interference eliminating method of claim 1, wherein step (e) further comprises:
   (e1) adjusting, by the base station, a transmitting power of the base station and the antenna setting of the antennas according to the first receiving performance.

4. The interference eliminating method of claim 1, further comprising:
   (f) determining, by the base station, a second receiving performance of the base station after step (e);
   (g) adjusting, by the base station, the antenna setting of the antennas according to the second receiving performance.

5. The interference eliminating method of claim 1, further comprising the following after step (c):
   (c1) determining, by the base station, that interference quality value is less than a threshold;
   (c2) transmitting, by the base station, a notification to the second mobile station according to the result of step (c1), wherein the notification is used for notifying the second mobile station to adjust a transmitting power;
   (c3) receiving, by the first mobile station, another signal from the second mobile station after step (c2);
   (c4) updating, by the first mobile station, the interference quality value according to the another signal;
   (c5) transmitting, by the first mobile station, the interference quality value to the base station after step (c4).

6. The interference eliminating method of claim 1, further comprising the following after step (c):
   (c1) determining, by the base station, that interference quality value is less than a threshold;
   (c2) transmitting, by the base station, a data transmission schedule to the first mobile station and the second mobile station according to the result of step (c1);
   (c3) receiving, by the first mobile station, another signal from the second mobile station after step (c2);
   (c4) updating, by the first mobile station, the interference quality value according to the another signal;
   (c5) transmitting, by the first mobile station, the interference quality value to the base station after step (c4).

7. An interference eliminating method for a base station, the base station being used in a Multiple-Input Multiple-Output (MIMO) network system, the MIMO network system further comprising a first mobile station, the base station having a plurality of antennas which are used for transmitting data to the first mobile station and receiving data from a second mobile station at the same time, the interference eliminating method comprising:
   (a) receiving, by the base station, an interference quality value from the first mobile station, wherein the interference quality value is determined by the first mobile station based on a signal from the second mobile station to the first mobile station;
   (b) determining, by the base station, a first receiving performance of the first mobile station according to the interference quality value;
   (c) adjusting, by the base station, an antenna setting of the antennas according to the first receiving performance, wherein the antenna setting records a transmitting antenna configuration and a receiving antenna configuration.

8. The interference eliminating method of claim 7, wherein the transmitting antenna configuration includes a transmitting antenna number and a transmitting antenna allocation, and the receiving antenna configuration includes a receiving antenna number and a receiving antenna allocation.

9. The interference eliminating method of claim 7, wherein step (c) further comprises:
   (c1) adjusting, by the base station, a transmitting power of the base station and the antenna setting of the antennas according to the first receiving performance.

10. The interference eliminating method of claim 7, further comprising:
    (d) determining, by the base station, a second receiving performance of the base station after step (c);
    (e) adjusting, by the base station, the antenna setting of the antennas according to the second receiving performance.

11. The interference eliminating method of claim 7, further comprising the following after step (a):
    (a1) determining, by the base station, that interference quality value is less than a threshold;
    (a2) transmitting, by the base station, a notification to the second mobile station according to the result of step (a1), wherein the notification is used for notifying the second mobile station to adjust a transmitting power;
    wherein the base station determines the first receiving performance of the first mobile station according to the interference quality value after the first mobile station receives another signal from the second mobile station, updates the interference quality value according to the another signal and transmits the updated interference quality value to the base station.

12. The interference eliminating method of claim 7, further comprising the following after step (a):
    (a1) determining, by the base station, that interference quality value is less than a threshold;
    (a2) transmitting, by the base station, a data transmission schedule to the first mobile station and the second mobile station according to the result of step (a1);
    wherein the base station determines the first receiving performance of the first mobile station according to the interference quality value after the first mobile station receives another signal from the second mobile station, updates the interference quality value according to the another signal and transmits the updated interference quality value to the base station.

13. A Multiple-Input Multiple-Output (MIMO) network system, comprising:
    a first mobile station; and
    a base station, having a plurality of antennas which are used for transmitting data to the first mobile station and receiving data from a second mobile station at the same time,
    wherein:
       the first mobile station receives a signal from the second mobile station;
       the first mobile station determines an interference quality value according to the signal;
       the first mobile station transmits the interference quality value to the base station;
       the base station determines a first receiving performance of the first mobile station according to the interference quality value; and
       the base station adjusts an antenna setting of the antennas stored in the base station according to the first receiving performance, wherein the antenna setting records a transmitting antenna configuration and a receiving antenna configuration.

14. The MIMO network system of claim 13, wherein the transmitting antenna configuration includes a transmitting antenna number and a transmitting antenna allocation, and the receiving antenna configuration includes a receiving antenna number and a receiving antenna allocation.

15. The MIMO network system of claim 13, wherein the base station adjusts a transmitting power of the base station and the antenna setting of the antennas according to the first receiving performance.

16. The MIMO network system of claim 13, wherein:
the base station further determines a second receiving performance of the base station; and
the base station further adjusts the antenna setting of the antennas according to the second receiving performance.

17. The MIMO network system of claim 13, wherein after the first mobile station transmits the interference quality value to the base station:
the base station determines that the interference quality value is less than a threshold;
the base station transmits a notification to the second mobile station after determining that the interference quality value is less than the threshold, wherein the notification is used for notifying the second mobile station to adjust a transmitting power;
the first mobile station receives another signal from the second mobile station;
the first mobile station updates the interference quality value according to the another signal; and
the first mobile station transmits the interference quality value to the base station.

18. The MIMO network system of claim 13, wherein after the first mobile station transmits the interference quality value to the base station:
the base station determines that the interference quality value is less than a threshold;
the base station transmits a data transmission schedule to the first mobile station and the second mobile station after determining that the interference quality value is less than the threshold;
the first mobile station receives another signal from the second mobile station;
the first mobile station updates the interference quality value according to the another signal; and
the first mobile station transmits the interference quality value to the base station.

19. A base station for a Multiple-Input Multiple-Output (MIMO) network system, the MIMO network system further comprising a first mobile station, the base station comprising:
a plurality of antennas for transmitting data to the first mobile station and receiving data from a second mobile station at the same time;
a storage unit, being configured to store an antenna setting of the antennas, wherein the antenna setting records a transmitting antenna configuration and a receiving antenna configuration;
a transceiver, being configured to receive an interference quality value from the first mobile station, wherein the interference quality value is determined by the first mobile station based on a signal from the second mobile station to the first mobile station; and
a processing unit, being configured to determine a first receiving performance of the first mobile station according to the interference quality value, and adjust the antenna setting of the antennas according to the first receiving performance.

20. The base station of claim 19, wherein the transmitting antenna configuration includes a transmitting antenna number and a transmitting antenna allocation, and the receiving antenna configuration includes a receiving antenna number and a receiving antenna allocation.

21. The base station of claim 19, wherein the processing unit is further configured to adjust a transmitting power of the base station and the antenna setting of the antennas according to the first receiving performance.

22. The base station of claim 19, wherein the processing unit is further configured to:
determine a second receiving performance of the base station; and
adjust the antenna setting of the antennas according to the second receiving performance.

23. The base station of claim 19, wherein the processing unit is further configured to:
determine that interference quality value is less than a threshold; and
transmit a notification to the second mobile station via the transceiver after determining that interference quality value is less than the threshold, wherein the notification is used for notifying the second mobile station to adjust a transmitting power;
wherein the base station determines the first receiving performance of the first mobile station according to the interference quality value after the first mobile station receives another signal from the second mobile station, updates the interference quality value according to the another signal and transmits the updated interference quality value to the base station.

24. The base station of claim 19, wherein the processing unit is further configured to:
determine that interference quality value is less than a threshold; and
transmit a data transmission schedule to the first mobile station and the second mobile station via the transceiver after determining that interference quality value is less than the threshold,
wherein the base station determines the first receiving performance of the first mobile station according to the interference quality value after the first mobile station receives another signal from the second mobile station, updates the interference quality value according to the another signal and transmits the updated interference quality value to the base station.

* * * * *